No. 634,732. Patented Oct. 10, 1899.
J. W. IVORY.
FASTENER FOR DENTAL INSTRUMENTS.
(Application filed June 7, 1899.)
(No Model.)
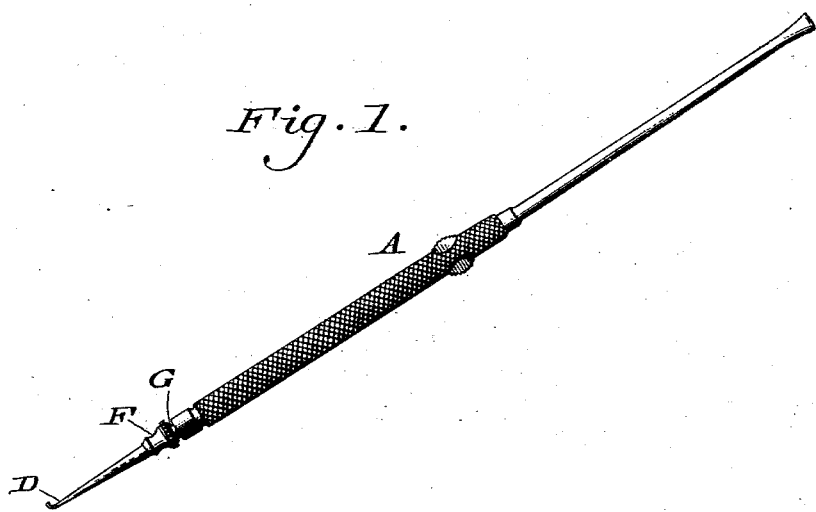
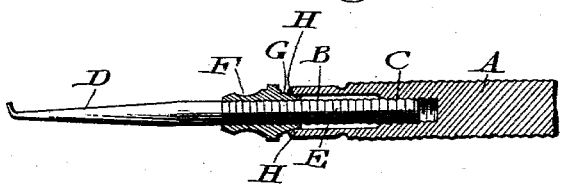
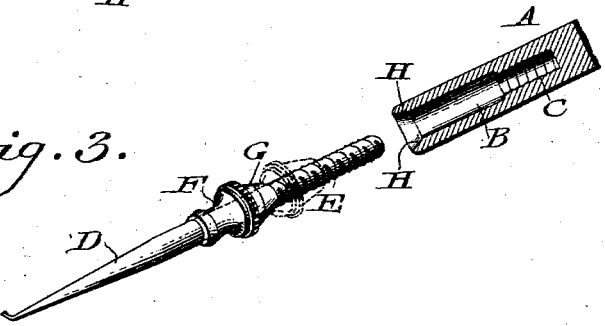
Witnesses
Inventor
James W. Ivory
Attorneys
THE NORRIS PETERS CO., PHOTO-LITHO., WASHINGTON, D. C.

United States Patent Office.

JAMES W. IVORY, OF PHILADELPHIA, PENNSYLVANIA.

FASTENER FOR DENTAL INSTRUMENTS.

SPECIFICATION forming part of Letters Patent No. 634,732, dated October 10, 1899.

Application filed June 7, 1899. Serial No. 719,665. (No model.)

*To all whom it may concern:*

Be it known that I, JAMES W. IVORY, a subject of the Queen of Great Britain, residing in the city and county of Philadelphia, State of Pennsylvania, have invented a new and useful Improvement in Fasteners for Dental Instruments, which improvement is fully set forth in the following specification and accompanying drawings.

My invention relates to an improvement in means employed for fastening a dental instrument to the handle thereof; and it consists in employing a nut with a conical collar and a screw-threaded shank on the instrument, said shank carrying said nut and engaging the handle, and said collar being adapted to tighten against the end of the handle, thus providing a firm and reliable connection for the instrument and preventing wabbling thereof.

Figure 1 represents a perspective view of a fastening for a dental instrument embodying my design. Fig. 2 represents a longitudinal section of a portion on an enlarged scale. Fig. 3 represents a perspective view of the fastening and adjacent portions and a section of part of the handle.

Similar letters of reference indicate corresponding parts in the figures.

Referring to the drawings, A designates a handle, the fore part of which has the bore B therein, the wall of a portion of the latter being threaded, as at C.

D designates a dental instrument which is provided with the screw-threaded shank E, which enters said bore B and engages with the threads C thereof, thus connecting said instrument with said handle. On the threaded portion of the shank is the nut F, on whose rear or inner end is the conical collar, which is adapted to engage the forward end of the handle A, said end being preferably beveled, as at H, so that said collar is enabled to take firm hold of said end.

The operation is as follows: The shank is inserted into the bore B and screwed thereto to full extent, when the nut F is tightened and wedged against the end of the handle, thus clamping the instrument to the handle and causing the same to retain its position on the latter in a steady and reliable manner without liability to wabble, shake, &c. The nut may, however, be left partly on the threaded portion of the shank, as shown in dotted lines, Fig. 3. In this case the instrument may be held by one hand and the handle grasped by the other hand and rotated so that it will screw upon the shank of the instrument and turn the nut with it to full extent, when there will be a locking engagement of the nut with the shank of the instrument at the forward end of the threaded portion thereof and likewise of the end of the bore or socket of the handle with the collar of the nut, thus interlocking the threads of the handle, nut, and shank of the instrument and causing an effective wedging, a close fit, and a tight binding of said parts.

Having thus described my invention, what I claim as new, and desire to secure by Letters Patent, is—

1. A fastening for a dental instrument consisting of a nut, a threaded shank on said instrument on which said nut is fitted, and a handle with a threaded bore receiving said shank, said nut having a conical collar which is adapted to wedge with the adjacent end of said handle.

2. A dental instrument provided with a screw-threaded shank and a nut thereon, the latter having a collar which is adapted to tighten against the handle of said instrument and which receives said shank.

3. A dental instrument having on the shank thereof, a nut which is provided with a conical collar for tightening the instrument on the handle which carries it.

JAMES W. IVORY.

Witnesses:
JOHN A. WIEDERSHEIM,
WM. C. WIEDERSHEIM.